United States Patent [19]
Tillett et al.

[11] Patent Number: 5,332,089
[45] Date of Patent: Jul. 26, 1994

[54] STORAGE PACKAGE FOR RECORDING MEDIUM

[75] Inventors: Jerry J. Tillett, Van Nuys; Ronald W. Womack, Fullerton, both of Calif.

[73] Assignee: Ivy Hill Corporation, New York, N.Y.

[21] Appl. No.: 81,975

[22] Filed: Jun. 23, 1993

[51] Int. Cl.⁵ .............................. B65D 85/57
[52] U.S. Cl. ........................... 206/310; 206/309; 206/807
[58] Field of Search ............ 206/307, 309, 310, 312, 206/313, 387, 444, 493, 523, 807

[56] References Cited

U.S. PATENT DOCUMENTS

| | | | |
|---|---|---|---|
| 3,109,539 | 11/1963 | Turoff | 206/310 |
| 3,980,178 | 9/1976 | Schidlowski | 206/523 |
| 4,084,690 | 4/1978 | Pulse | 206/310 |
| 4,176,744 | 12/1979 | Borzak | 206/310 |
| 4,327,831 | 5/1982 | Inaba et al. | 206/310 |
| 4,511,034 | 4/1985 | Pan | 206/312 |
| 4,623,062 | 11/1986 | Chase | 206/807 |
| 4,635,792 | 1/1987 | Yamada et al. | 206/310 |
| 4,819,799 | 4/1989 | Nomula et al. | 206/312 |
| 4,874,085 | 10/1989 | Grobecker et al. | 206/310 |
| 4,895,252 | 1/1990 | Nomula et al. | 206/312 |

FOREIGN PATENT DOCUMENTS

| | | | |
|---|---|---|---|
| 0493983 | 7/1992 | European Pat. Off. | 206/310 |
| 7707146 | 6/1978 | Sweden | 206/312 |

OTHER PUBLICATIONS

Photos of "Realistic Compact Disc Laser Lens Cleaner" no date.

*Primary Examiner*—Jimmy G. Foster
*Attorney, Agent, or Firm*—Amster, Rothstein & Ebenstein

[57] ABSTRACT

A storage package for a recording medium defining a central aperture therethrough, includes a plurality of non-rigid panels movable between an open orientation and a closed orientation, each of the plurality of panels being overlapping in the closed orientation, and at least some of the plurality of panels being non-overlapping in the open orientation. A holder for a storage medium is fixedly secured to one of the panels and extends intermediate a pair of the panels when the plurality of panels is in the closed orientation. The holder is formed of an easily but resiliently compressible material and is configured and dimensioned to extend snugly through the central aperture of the recording medium, thereby to retain the recording medium on the holder until the recording medium is forcibly removed therefrom. Preferably the holder is configured and dimensioned for a compact disc.

15 Claims, 3 Drawing Sheets

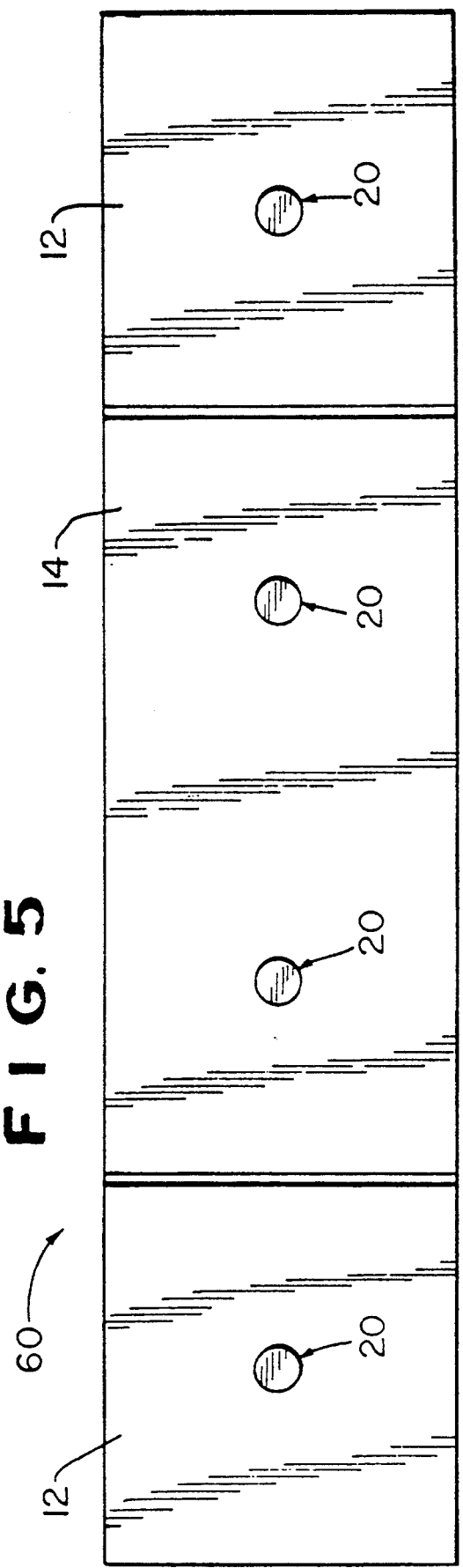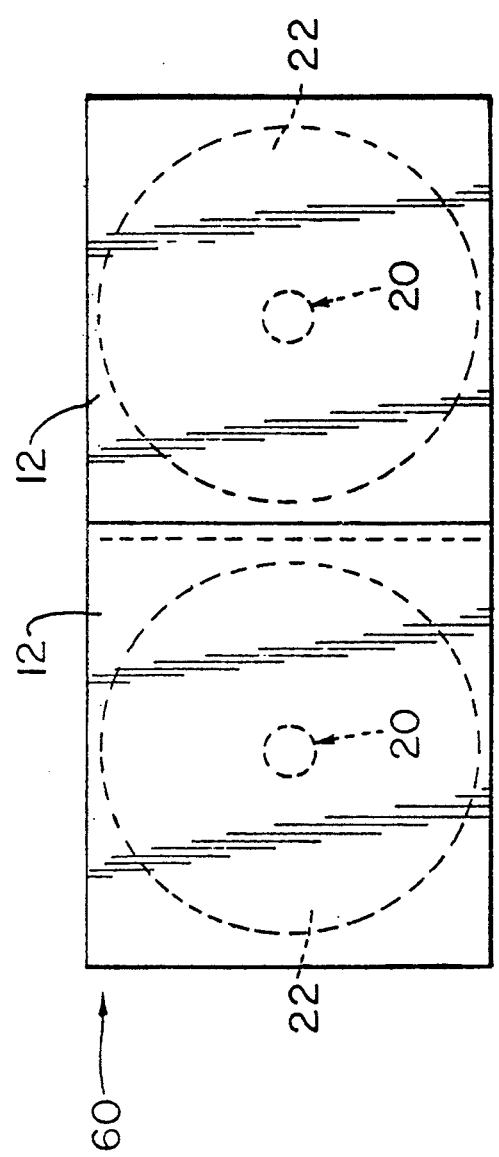

1

STORAGE PACKAGE FOR RECORDING MEDIUM

BACKGROUND OF THE INVENTION

The present invention relates to a storage package for a recording medium defining a central aperture therethrough, and more particularly to a simple and economical storage package for a compact disc.

U.S. Pat. No. 4,874,085 discloses the conventional all-plastic "jewel box" employed for the storage of recording media such as the compact disc. An elevated rest for the bottom surface of the compact disc extends upwardly from the rigid bottom panel of the jewel box. A peg or rosette extends upwardly from the elevated rest through the central aperture of the compact disc. The upper panel or the rosette defines means for contacting the upper surface of the compact disc. The elevated rest spaces the delicate information-carrying bottom surface of the compact disc from the hard rigid plastic bottom panel of the jewel box so that the disc is not scratched by the panel, while at the same time providing a gap at the outer edge of the compact disc between the bottom surface of the disc and the top surface of the bottom panel so that the user can grasp the compact disc easily for removal thereof from the jewel box. The means for contacting the upper surface of the compact disc (whether it be part of the rosette or the top panel) preclude accidental dislodgment of the compact disc from the rosette.

The elevated rest and rosette combination has been retained in subsequent generations of storage packages for a recording medium having a central aperture therethrough, as exemplified in the various patents commonly owned by the Ivy Hill Packaging Corp. including Ser. Nos. 07/698,201, 07/807,477, and 07/817,897. While the additional cost involved in providing the elevated rest and the rosette is not particularly high for a given storage package, in view of the enormous volume of storage packages produced, even a fractional cent saving in the cost of manufacture is significant. On the other hand, due to the highly competitive nature of the storage package industry, no attempt to lower the cost of manufacture may render the use of the package by the consumer more difficult.

Accordingly, it is an object of the present invention to provide a storage package for a recording medium defining a central aperture therethrough having an improved holder.

Another object is to provide such a storage package wherein the holder is more economical to manufacture than the conventional elevated rest and rosette combination and yet permits easy removal of the recording medium from the storage package by the user.

A further object is to provide such a storage package wherein in one embodiment the holder assists in maintaining the panels of the storage package in a closed orientation.

It is also an object of the present invention to provide such a storage package wherein in one embodiment tearing of a panel of the storage package is required in order to remove the storage medium.

It is a further object to provide such a storage package which can accommodate two or more storage media therein.

SUMMARY OF THE INVENTION

It has now been found that the above and related objects of the present invention are obtained in a storage package for a recording medium defining a central aperture therethrough, comprising a plurality of non-rigid panels movable between an open orientation and a closed orientation, each of the plurality of panels being overlapping in the closed orientation, and at least some of the plurality of panels being non-overlapping in the open orientation. A holder for a storage medium is fixedly secured to one of the panels and extends intermediate a pair of the panels when the plurality of panels is in the closed orientation. The holder is formed of an easily but resiliently compressible material and is configured and dimensioned to extend snugly through the central aperture of the recording medium, thereby to retain the recording medium on the holder until the recording medium is forcibly removed therefrom. Preferably the holder is configured and dimensioned for holding a compact disc.

In a preferred embodiment, the panels are non-plastic, substantially flexible, and preferably formed of paperboard. The one panel is resiliently bowable to facilitate grasping of the recording medium for removal from the holder, and the other of the pair of panels may define a score line. The holder is preferably formed of a foamed material. The holder has a pair of opposed end surfaces, one of the opposed end surfaces being adhesively secured to the one panel and the other of the opposed end surfaces being free. Preferably the holder is of generally cylindrical configuration.

The free end surface of the holder may be non-adhesive, weakly adhesive (thereby to releasably maintain the pair of panels in the closed orientation, while permitting forcible movement of the plurality of panels to the open orientation), or strongly adhesive (so that, when adhered to the other of the pair of panels when the plurality of panels is in the closed orientation, it precludes forcible movement of the plurality of panels to the open orientation without tearing a panel). A release paper may be removably affixed over the strongly adhesive free end surface of the holder, thereby to enable repeated movement of the plurality of panels from the closed orientation to the open orientation until the release paper is removed to expose the strongly adhesive free end of the holder.

BRIEF DESCRIPTION OF THE DRAWING

The above and related objects, features and advantages of the present invention will more fully be understood by reference to the following detailed description of the presently preferred, albeit illustrative, embodiments of the present invention, when taken in conjunction with the accompanying drawing wherein:

FIGS. 5 and 6 are front elevational views of an embodiment of the storage package for holding four compact discs, the storage package being illustrated in the open and closed orientations, respectively.

DETAILED DESCRIPTION OF THE PREFERRED EMBODIMENTS

Figure 1:
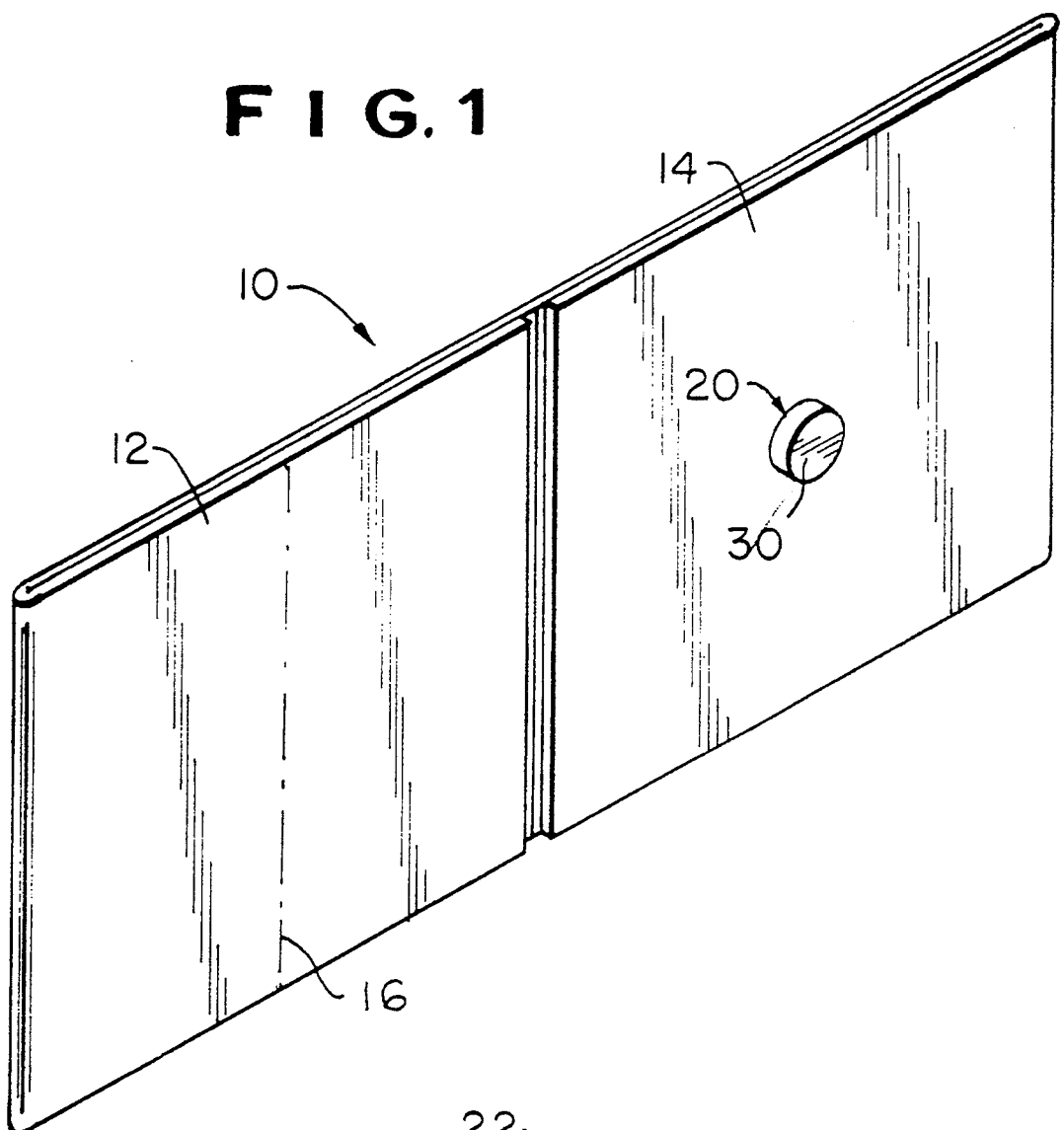
FIG. 1 is an isometric view of a storage package according to the present invention in the open orientation.
Figure 2:
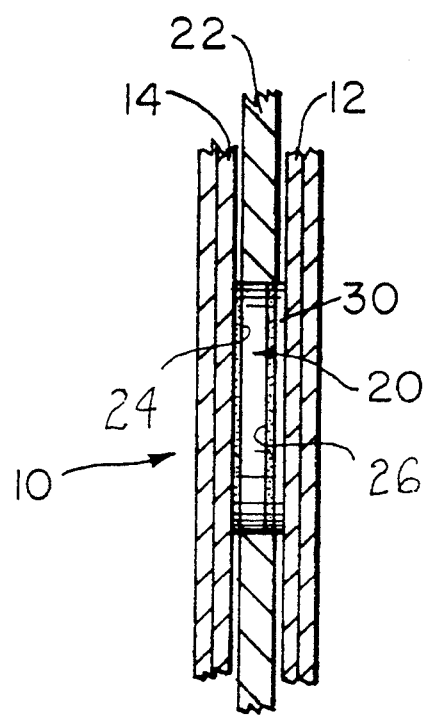
FIG. 2 is a side elevational view of the storage package in a closed orientation with a compact disc stored therein.
Figure 3:
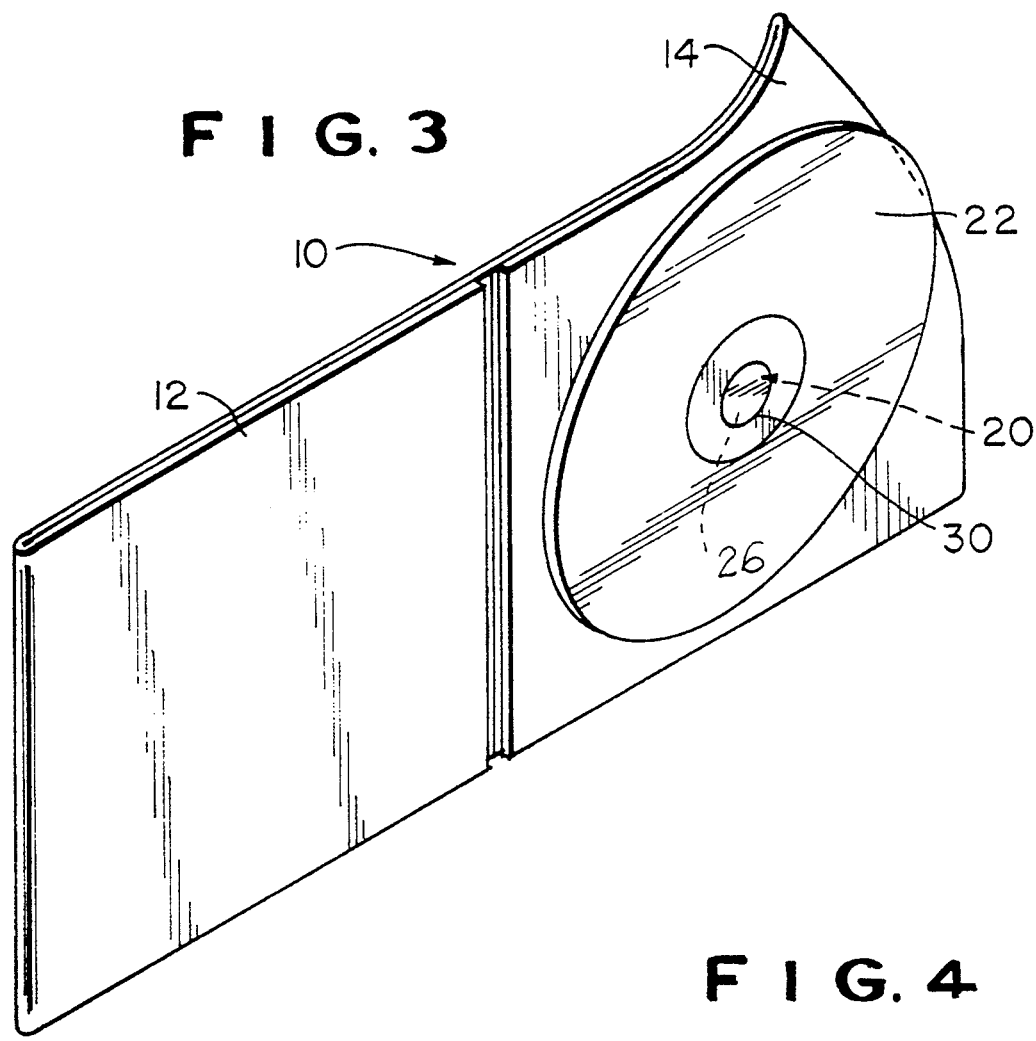
FIG. 3 is an isometric view of the open storage package, including a compact disc.

Referring now to the drawing, and in particular to FIGS. 1 and 2 thereof, therein illustrated is a storage package according to the present invention, generally indicated by the reference numeral 10. The storage package 10 comprises a plurality of non-rigid panels 12, 14. The panels 12, 14 are movable between an open orientation (as illustrated in FIG. 1) and a closed orientation (as illustrated in FIG. 2), each of the plurality of panels 12, 14 being overlapping in the closed orientation (FIG. 2), and at least some of the plurality of panels being non-overlapping in the open orientation (FIG. 1).

As the storage package 10 illustrated in FIGS. 1 and 2 has only two panels 12, 14, panel 12 will be referred to as the top panel, and panel 14 will be referred to as the bottom panel. It will be appreciated, however, that in fact there may be a plurality of other panels which, in a closed orientation, are overlapping and disposed either on top of top panel 12 or below bottom panel 14.

The panels 12, 14 are presumably substantially flexible and may be conveniently be formed of paperboard. In particular, the bottom panel 14 is resiliently flexible, thereby to facilitate grasping of the recording medium for removal thereof from the holder as will be explained hereinafter. The top panel 12 may define a scoreline 16 for reasons which will become apparent hereinafter.

Each of the panels 12, 14 may constitute a single thickness of paperboard. However, as paperboard is typically coated for printing on only one surface thereof and as it is usually desired to provide an attractive package color printed on all surfaces thereof, each of the panels 12, 14 is preferably formed of a double thickness of paperboard. Such panels 12, 14 may be formed from a 1×4 blank layout of four flaps, with the outer flaps being folded over the inner flaps to define the pair of double-thickness panels 12, 14. Alternatively, the panels 12, 14 may be formed from a 2×2 blank layout of four flaps with the upper flaps being folded downwardly over the lower flaps (or the lower flaps being folded upwardly over the upper flaps) to define the double-thickness panels 12, 14. Triple thickness panels may also be used.

A holder 20 for the storage medium 22 (see FIG. 2) is fixedly secured to one of the panels (here illustrated as the bottom panel 14) and extends intermediate a pair of the panels 12, 14 when the plurality of panels is in the closed orientation. The holder 20 extends upwardly from the bottom panel 14 towards the top panel 12, and preferably extends all of the way between the two panels so that the free end thereof abuts the top panel 12 and the storage medium 22 cannot become displaced from the holder 20 while the panels are in the closed configuration. The holder 20 is configured and dimensioned to extend snugly through the central aperture of the recording medium 22, thereby to retain the recording medium 22 on the holder 20 until the recording medium 22 is forcibly removed therefrom.

The configuration and dimensions of the holder 20 are determined by the configuration and dimensions of the central aperture of the recording medium 22, just as the outer dimensions of the panels 12, 14 are determined by the outer dimensions of the recording medium 22. For example, the panels 12, 14 are of sufficient height and width to completely cover the upper and lower surfaces of the compact disc 22 so as to provide protection therefor, and in particular the surface thereof where information is recorded. Similarly, the dimensions of the holder 20 are determined by the need of the holder to extend snugly through the central aperture of the compact disc 22 so as to engage and hold the same in place while, at the same time, enabling easy forcible removal therefrom. The holder 20 has an outer diameter at least as great as the inner diameter of the central aperture of the storage medium 22 to be placed thereon. Accordingly, the outward pressure exerted by the outer surface of the holder 20 is directed against the inner surface of the central aperture of the storage medium 22, thereby to avoid accidental displacement of the storage medium 22 from the holder 20.

The holder 20 is preferably formed of a resiliently compressible material such as a cross-linked, closed-cell polyolefin foam providing the desired easily but resiliently compressible nature. When the holder 20 is slightly oversized relative to the central aperture of the recording medium 22, it suffices for the holder to snugly extend through the central aperture. While there may be some minimal overlap of a portion of the holder 20 above the compact disc 22, such overlap will generally be minimal and is not relied upon to maintain the compact disc 22 on the holder 20.

The holder 20 preferably has a cylindrical configuration with a pair of opposed end surfaces 24, 26. One of the opposed end surfaces 24 is adhesively secured to the bottom panel 14, and other of the opposed end surface 26 is free, typically being disposed adjacent the top panel 12 when the panels are in the closed configuration. The holder free end surface 26 is preferably functionally non-adhesive in a first preferred embodiment of the present invention, and it therefore plays no role in maintaining the panels 12, 14 in the closed configuration. The functional non-adhesive nature of the holder free end surface 26 may result either from the absence of any adhesive thereon or, if adhesive is present, the attachment of release or non-release paper thereover so as to block any contact between the adhesive and the top panel.

In a second preferred embodiment, however, the free end surface 26 of the holder 20 is weakly adhesive. Thus, when the panels 12, 14 are disposed in the closed orientation, the weakly adhesive free end surface 26 will releasably maintain the top panel 12 thereagainst so that the pair of panels are releasably maintained in the closed orientation. However, due to the weakly adhesive nature thereof, the free end surface 26 permits an easy forcible movement of the plurality of panels 12, 14 to the open orientation. In order to prevent the storage package 10 from randomly developing creases in the top panel 12 from forcible pulling thereon to separate it from the weakly adhesive end surface 26, the top panel 12 may be provided with an intentional foldline 16, thus avoiding the formation of random crease lines therein.

In a third preferred embodiment, the holder free end surface 26 is strongly adhesive so that, when the strongly adhesive free end surface 26 is adhered to the top panel 12 when the plurality of panels is in the closed orientation, it precludes forcible movement of the plurality of panels to the open orientation without some tearing of the storage package 10, typically tearing one of the panels 12, 14 (usually the top panel 12).

The advantages of a self-destructing embodiment are peculiar to the recording medium industry. Thus, the self-destructing embodiment may be used for mailers or flyers where it is desired that, once the mailer or the flyer is opened to reveal and enable access to the storage medium 22, there is no convenient, neat package left for storage of the recording medium 22. Presumably this encourages rapid use of the recording medium and, perhaps, its being passed on to a friend after use. Another utility of a self-destructing embodiment is in connection with a storage medium containing information which is subject to a label license. The label license may provide that, once the storage package has been opened, the opener is deemed to have consented to the label license. Thus, the mutilation of storage package 10, most typically at the bottom surface of the top panel 12, provides evidence that the package has been opened (and presumably the recording medium used).

It may indeed be desirable that the strongly adhesive free end surface 26 of the holder 20 not be secured to the facing panel initially. For example, the storage adherence of the holder 20 to both panels 12, 14 may not be desirable during the manufacturing process or even when the package is in the hands of the consumer until the consumer decides that he wishes to "lock" the package in the closed orientation so as to evidence any subsequent movement thereof from the closed orientation. In these instances, release paper 30 is initially removably affixed over the strongly adhesive free end surface 26, thereby to enable repeated movement of the plurality of panels from the closed orientation to the open orientation until the release paper 30 is removed to expose the strongly adhesive free end 26 and thereby "lock" the storage package. The release paper 30 has an outer diameter which is as large as the outer diameter of the strongly adhesive free end surface 26 and in effect renders the strongly adhesive free end surface into a functionally non-adhesive surface until such time as the release paper 30 is intentionally removed either by the manufacturer or the consumer.

Figure 4:
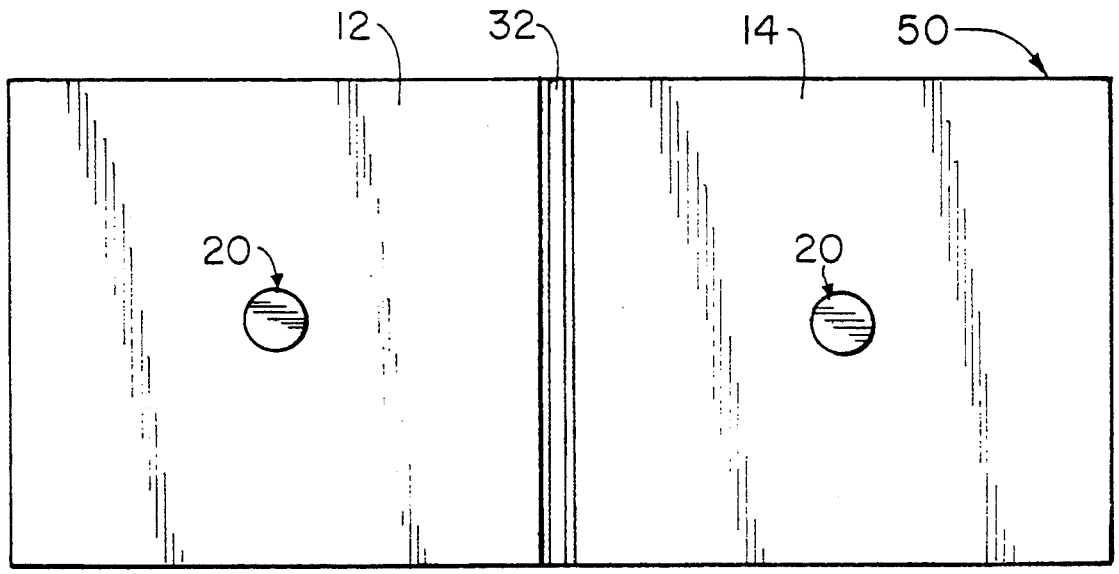
FIG. 4 is a front elevational view of an embodiment of the storage package of the present invention for holding a pair of compact discs.

The principles of the present invention are equally applicable to storage packages for holding not just one compact disc, but rather two or more. Referring now to FIG. 4, therein illustrated is such an embodiment 50 for two discs, each of the panels 12, 14 having a holder 20 projecting therefrom, typically with the free ends of each holder 20 being aligned and abutting when the plurality of panels 12, 14 is in the closed orientation. Each of the free end surfaces of the two holders 20 may be weakly adhesive so that, when they come into abutting contact when the plurality of panels are in a closed orientation, they hold the panels in the closed orientation until they are easily but forcibly moved apart.

Referring now to FIG. 4, therein illustrated is a variant 50 of the two disc embodiment wherein a spine 52 is disposed intermediate the panels 12, 14 in order to enable the package to form a box-like configuration in the closed orientation. The spine 52 may be of a single thickness, even where the panels 12, 14 are of double thickness.

Referring now to FIGS. 5 and 6, therein illustrated is an embodiment 60 for four discs. The back panel 14 has two laterally spaced holders 20 thereon, the width of the bottom panel 14 and the spacing between the holders 20 being such as to enable two compact discs 22 to be placed side by side on the holders 20 of the bottom panel 14. There are two top panels 12, each top panel 12 being connected by a foldline (or a spine) to a respective lateral side of the bottom panel 14 and defining a holder 20 aligned with and extending toward a respective one of the holders 20 of the bottom panel 14 when the panels are in the closed orientation. To facilitate opening of the storage package 60, one of the top panels 12 preferably overlaps the other top panel 12.

The storage package according to the present invention may be formulated for holding an even greater plurality of discs, using panels of greater size or additional panels.

The holders 20 are conveniently formed from large sheets of material available under the tradename Twin-Stick 201 from Duraco Inc. (Chicago, Ill.). The sheets are typically of appropriate thickness and need only be die-cut by a circular die in order to form therefrom suitable holders. The sheet comprises an easily but resiliently compressible material with two strongly adhesive end surfaces, with release paper being disposed over each strongly adhesive end surface. Once a circular piece has been stamped out from the sheet, one of the release papers is removed and the thereby exposed one adhesive end surface is then applied to the desired panel. A conventional machine for, in effect, blowing the exposed adhesive end surface of the holder against the desired panel is available under the tradename Labelaire from Labelaire Inc. (Fullerton, Calif.). The release paper may be left on the opposite end of the holder in the embodiments where the holder free end surface is functionally non-adhesive or is strongly adhesive and initially covered by release paper.

A free end surface 26 may be "functionally non-adhesive" either because it is devoid of adhesive or because it has adhesive and release or non-release paper disposed over the adhesive so that the adhesive does not come into play (except to hold the paper thereon). For the weakly adhesive free end surface 26, special sheets having strongly adhesive material adjacent one surface and weakly adhesive material adjacent the opposed surface may be purchased, or the adhesive nature of one of the end surfaces of a commercially purchased sheet may be modified (i.e., weakened) prior to die-cutting of the holders from the sheet.

Because the present invention requires only the mass-produced sheets in order to form the holders of the storage package, the storage package of the present invention is sufficiently economical to manufacture that it may be employed as a mailer for shipment of products to customers.

The storage medium 22 is typically a compact disc. It will appreciated that the term "compact disc" as used herein encompasses a variety of different devices of various sizes, including the CD-ROM (compact disc-read only memory), floppy discs, mini- and micro- discs, and the like. The compact disc may be pre-recorded or recordable, and may have digital information storage (audio, visual or data) on the upper surface thereof instead of or in addition to the lower surface thereof.

To summarize, the present invention provides a storage package having an improved holder for a recording medium defining a central aperture therethrough. The holder is more economical to manufacture than the conventional elevated rest and rosette combination and permits easier removal of the recording medium from the storage package by the user. In particular embodiments, the holder may assist in maintaining the panels of the storage package in a closed orientation or may require tearing of a panel of the storage package in order to remove the storage medium therefrom. The storage package can be designed to accommodate two or more storage media therein.

Now that the preferred embodiments of the present invention have been shown and described in detail, various modifications and improvements thereon can become really apparent to those skilled in the art. Accordingly, the present scope of the present invention is to be construed broadly and limited only by the appended claims, and not by the foregoing specifications.

We claim:

1. A storage package for a recording medium defining a central aperture therethrough, comprising:
   (A) a plurality of non-rigid, resiliently bowable panels formed of paperboard movable between an open orientation and a closed orientation, each of said plurality of panels being overlapping in said closed orientation, and at least some of said plurality of panels being non-overlapping in said open orientation; and
   (B) a holder for a storage medium fixedly secured to one of said panels and extending intermediate a pair of said panels when said plurality of panels is in said closed orientation, said holder being formed of an easily but resiliently compressible foamed material and being configured and dimensioned as a cylinder to extend snugly through the central aperture of the recording medium, thereby to retain the recording medium on said holder until the recording medium is forcibly removed therefrom, said holder having a pair of opposed end surfaces, one of said opposed end surfaces being adhesively secured to said one panel and the other of said opposed end surfaces being free.

2. The package of claim 1 wherein said holder is configured and dimensioned for holding a compact disc.

3. The package of claim 1 wherein said panels are substantially flexible.

4. The package of claim 1 wherein said one panel is resiliently bowable to facilitate grasping of the recording medium for removal from the holder.

5. The package of claim 1 wherein the other of said pair of panels defines a score line passing through a projection of said holder.

6. The package of claim 1 wherein said free end surface of said holder is functionally non-adhesive.

7. A storage package for a recording medium defining a central aperture therethrough, comprising:
   (A) a plurality of non-rigid panels movable between an open orientation and a closed orientation, each of said plurality of panels being overlapping in said closed orientation, and at least some of said plurality of panels being non-overlapping in said open orientation; and
   (B) a holder for a storage medium fixedly secured to one of said panels and extending intermediate a pair of said panels when said plurality of panels is in said closed orientation, said holder being formed of an easily but resiliently compressible material and being configured and dimensioned to extend snugly through the central aperture of the recording medium, thereby to retain the recording medium on said holder until the recording medium is forcibly removed therefrom, said holder having a pair of opposed end surfaces, one of said opposed end surfaces being adhesively secured to said one panel and the other of said opposed end surfaces being free, said free end surface of said holder being weakly adhesive, thereby to releasably maintain said pair of panels in said closed orientation, while permitting forcible movement of said plurality of panels to said open orientation.

8. A storage package for a recording medium defining a central aperture therethrough, comprising:
   (A) a plurality of non-rigid panels movable between an open orientation and a closed orientation, each of said plurality of panels being overlapping in said closed orientation, and at least some of said plurality of panels being non-overlapping in said open orientation; and
   (B) a holder for a storage medium fixedly secured to one of said panels and extending intermediate a pair of said panels when said plurality of panels is in said closed orientation, said holder being formed of an easily but resiliently compressible material and being configured and dimensioned to extend snugly through the central aperture of the recording medium, thereby to retain the recording medium on said holder until the recording medium is forcibly removed therefrom, said holder having a pair of opposed end surfaces, one of said opposed end surfaces being adhesively secured to said one panel and the other of said opposed end surfaces being free, said free end surface of said holder being strongly adhesive and, when adhered to the other of said pair of panels when said plurality of panels is in closed orientation, precluding forcible movement of said plurality of panels to said open orientation without tearing of a panel.

9. The package of claim 8 additionally including a release paper removably affixed over said strongly adhesive free end surface of said holder, thereby to enable repeated movement of said plurality of panels from said closed orientation to said open orientation until said release paper is removed to expose said strongly adhesive free end of said holder.

10. The package of claim 8 for storing a plurality of recording media, wherein a plurality of said holders are fixedly secured to said panels.

11. A storage package for a recording medium defining a central aperture therethrough, comprising:
    (A) a plurality of non-rigid, non-plastic, substantially flexible panels formed of paperboard and movable between an open orientation and a closed orientation, each of said plurality of panels being overlapping in said closed orientation, and at least some of said plurality of panels being non-overlapping in said open orientation; and
    (B) a holder for a storage medium fixedly secured to one of said panels and extending intermediate a pair of said panels when said plurality of panels is in said closed orientation, said holder being formed of an easily but resiliently compressible foamed material and being configured and dimensioned as a cylinder to extend snugly through the central aperture of the recording medium, thereby to retain the recording medium on said holder until the recording medium is forcibly removed therefrom, said holder having a pair of opposed end surfaces, one of said opposed end surfaces being adhesively secured to said one panel and the other of said opposed end surfaces being free.

12. The package of claim 11 wherein said free end surface of said holder is functionally non-adhesive.

13. The package of claim 11 wherein said free end surface of said holder is weakly adhesive, thereby to releasably maintain said pair of panels in said closed orientation, while permitting forcible movement of said plurality of panels to said open orientation.

14. The package of claim 11 wherein said free end surface of said holder is strongly adhesive and, when adhered to the other of said pair of panels when said plurality of panels is in said closed orientation, precludes forcible movement of said plurality of panels to said open orientation without tearing of a panel, said package additionally including release paper removably affixed over said strongly adhesive free end surface of said holder, thereby to enable repeated movement of said plurality of panels from said closed orientation to said open orientation until said release paper is removed to expose said strongly adhesive free end of said holder.

15. The package of claim 11 for storing a plurality of recording media, wherein a plurality of said holders are fixedly secured to said panels.

* * * * *